United States Patent
Xu et al.

(10) Patent No.: US 12,348,454 B2
(45) Date of Patent: Jul. 1, 2025

(54) METHODS AND APPARATUS FOR DCI TRANSMISSION OVER PDSCH

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 17/794,901

(22) PCT Filed: Apr. 4, 2020

(86) PCT No.: PCT/CN2020/083388
§ 371 (c)(1),
(2) Date: Jul. 22, 2022

(87) PCT Pub. No.: WO2021/196247
PCT Pub. Date: Oct. 7, 2021

(65) Prior Publication Data
US 2023/0110100 A1  Apr. 13, 2023

(51) Int. Cl.
*H04L 5/00* (2006.01)

(52) U.S. Cl.
CPC .......... *H04L 5/0053* (2013.01); *H04L 5/0044* (2013.01)

(58) Field of Classification Search
CPC ............................ H04L 5/0044; H04L 5/0053
See application file for complete search history.

(56) References Cited

U.S. PATENT DOCUMENTS

| | | | |
|---|---|---|---|
| 2009/0070653 A1* | 3/2009 | Kim | H03M 13/091 714/E11.032 |
| 2017/0034740 A1 | 2/2017 | Rico Alvarino et al. | |

(Continued)

FOREIGN PATENT DOCUMENTS

| | | |
|---|---|---|
| CN | 105210433 A | 12/2015 |
| CN | 106856613 A | 6/2017 |

(Continued)

OTHER PUBLICATIONS

Supplementary Partial European Search Report—EP20928408—Search Authority—Munich—Mar. 19, 2024.

(Continued)

*Primary Examiner* — Kevin C. Harper
(74) *Attorney, Agent, or Firm* — Procopio, Cory, Hargreaves & Savitch LLP (57) ABSTRACT

The present disclosure relates to methods and devices for wireless communication including an apparatus, e.g., a base station and/or UE. The apparatus can calculate a number of coded bits based on a number of downlink control information (DCI) information bits. The apparatus can also determine an amount of one or more code blocks (CBs) in DCI based on at least one of the number of coded bits or the number of DCI information bits, each of the one or more CBs including a plurality of the coded bits. Moreover, the apparatus can transmit a physical downlink shared channel (PDSCH) including the DCI, wherein the DCI includes at least one of the one or more CBs or one or more coded blocks. The apparatus can also encode the one or more CBs in the DCI based on the determined amount of one or more CBs.

30 Claims, 6 Drawing Sheets

(56) References Cited

U.S. PATENT DOCUMENTS

| | | | |
|---|---|---|---|
| 2017/0230994 A1* | 8/2017 | You | H04L 5/0053 |
| 2018/0167129 A1* | 6/2018 | Aiba | H04B 7/0805 |
| 2019/0123880 A1 | 4/2019 | Fan et al. | |
| 2019/0268854 A1 | 8/2019 | Suzuki et al. | |
| 2019/0349977 A1 | 11/2019 | Hosseini et al. | |
| 2020/0128529 A1* | 4/2020 | Wang | H04L 5/0091 |
| 2021/0058205 A1* | 2/2021 | Zhu | H04W 72/0466 |

FOREIGN PATENT DOCUMENTS

| | | | | |
|---|---|---|---|---|
| CN | 110890943 A | 3/2020 | | |
| EP | 3499771 A1 | 6/2019 | | |
| WO | WO-2018143890 A1 * | 8/2018 | | H03M 13/09 |
| WO | 2020063723 A1 | 4/2020 | | |
| WO | 2020140967 A1 | 7/2020 | | |

OTHER PUBLICATIONS

ETSI MCC: "Report of 3GPP TSG RAN2#101 bis meeting, Sanya, China", 3GPP TSG-RAN WG2 meeting #102, R2-1806601, May 25, 2018 (May 25, 2018), 272 Pages, sections 7-9.
International Search Report and Written Opinion—PCT/CN2020/083388—ISA/EPO—Dec. 30, 2020.

* cited by examiner

METHODS AND APPARATUS FOR DCI TRANSMISSION OVER PDSCH

CROSS REFERENCE TO RELATED APPLICATION(S)

This application is National Stage Application filed under 35 U.S.C. § 371 of PCT International Application Serial No. PCT/CN2020/083388 entitled "METHODS AND APPARATUS FOR DCI TRANSMISSION OVER PDSCH" and filed on Apr. 4, 2020, which is expressly incorporated by reference herein in its entirety.

BACKGROUND

Technical Field

The present disclosure relates generally to communication systems, and more particularly, to downlink control information (DCI) transmission in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The apparatus may receive an indication of a number of downlink control information (DCI) information bits. The apparatus may also calculate a number of coded bits based on a number of downlink control information (DCI) information bits. The apparatus may also determine an amount of one or more code blocks (CBs) in DCI based on at least one of the number of coded bits or the number of DCI information bits, each of the one or more CBs including a plurality of the coded bits. Moreover, the apparatus may segment the number of coded bits into the amount of one or more CBs. The apparatus may also modulate the number of coded bits into a plurality of symbols. The apparatus may also encode the one or more CBs in the DCI based on the determined amount of one or more CBs, where the encoded one or more CBs may correspond to the one or more coded blocks. Additionally, the apparatus may transmit a physical downlink shared channel (PDSCH) including the DCI, wherein the DCI includes at least one of the one or more CBs or one or more coded blocks.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
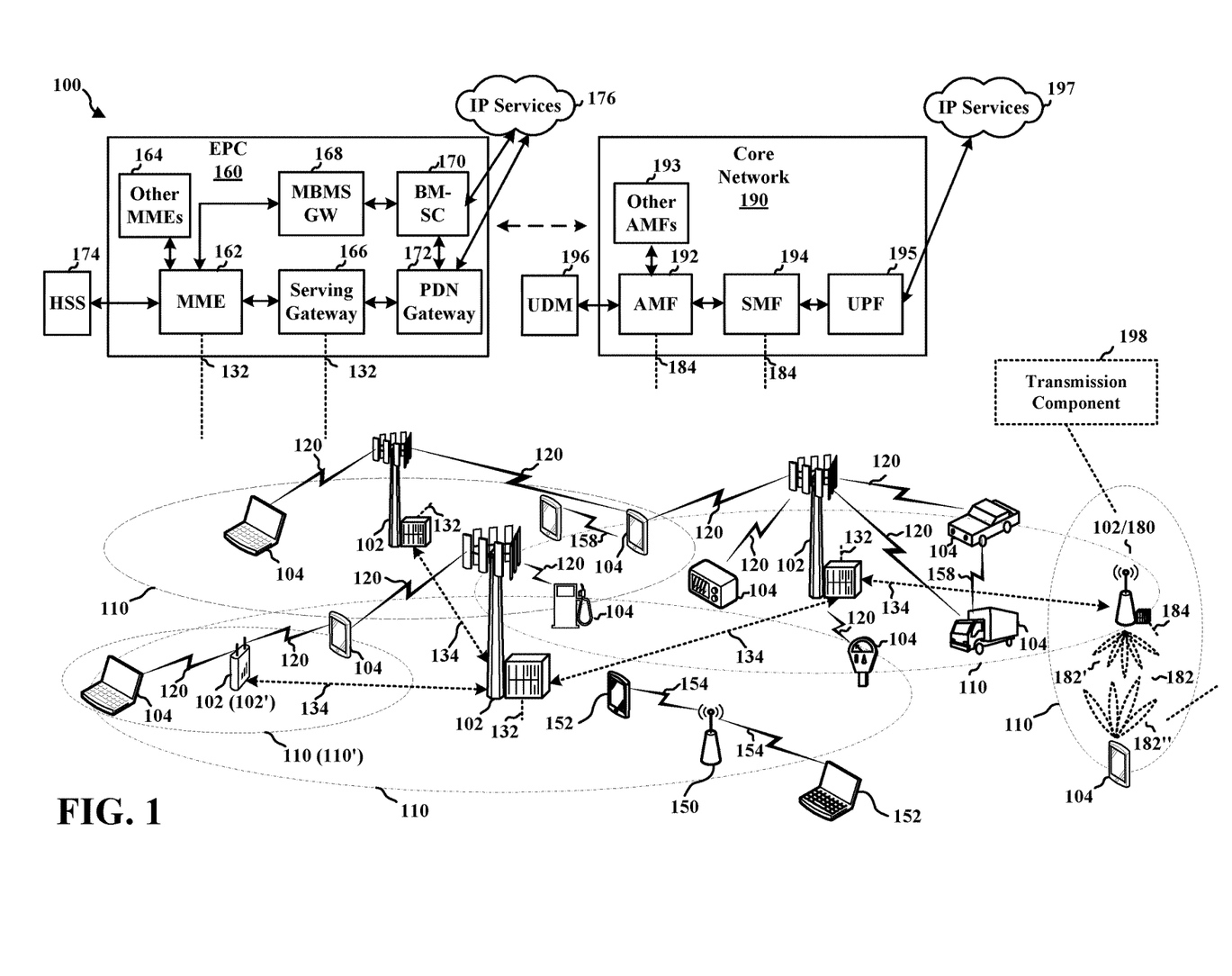
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a transmission component 198 configured to receive an indication of a number of downlink control information (DCI) information bits. Transmission component 198 may also be configured to calculate a number of coded bits based on a number of downlink control information (DCI) information bits. Transmission component 198 may also be configured to determine an amount of one or more code blocks (CBs) in DCI based on at least one of the number of coded bits or the number of DCI information bits, each of the one or more CBs including a plurality of the coded bits. Transmission component 198 may also be configured to segment the number of coded bits into the amount of one or more CBs. Transmission component 198 may also be configured to modulate the number of coded bits into a plurality of symbols. Transmission component 198 may also be configured to encode the one or more CBs in the DCI based on the determined amount of one or more CBs, where the encoded one or more CBs may correspond to the one or more coded blocks. Transmission component 198 may also be configured to transmit a physical downlink shared channel (PDSCH) including the DCI, wherein the DCI includes at least one of the one or more CBs or one or more coded blocks.

Although the following description may be focused on 5G NR, the concepts described herein may be applicable to other similar areas, such as LTE, LTE-A, CDMA, GSM, and other wireless technologies.

Figure 2A:
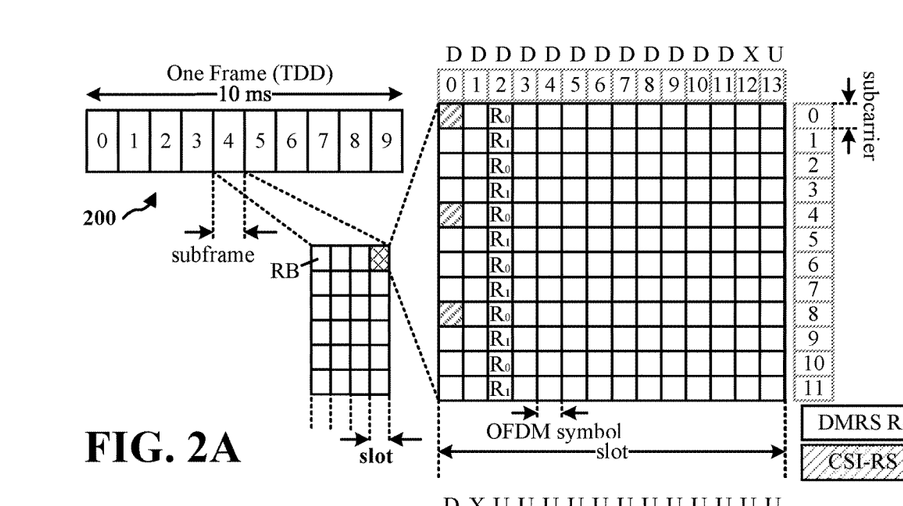
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
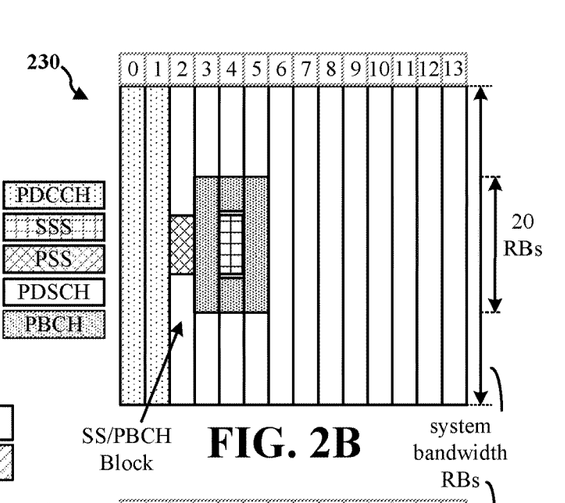
Figures 2C, 2D:
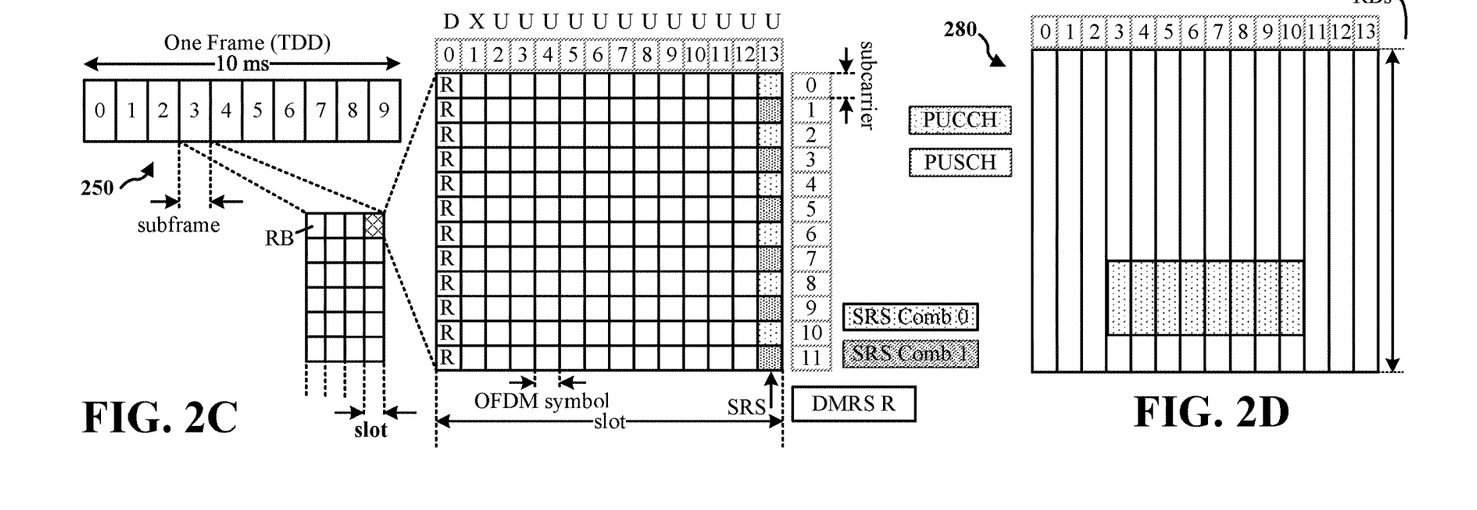

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100$x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
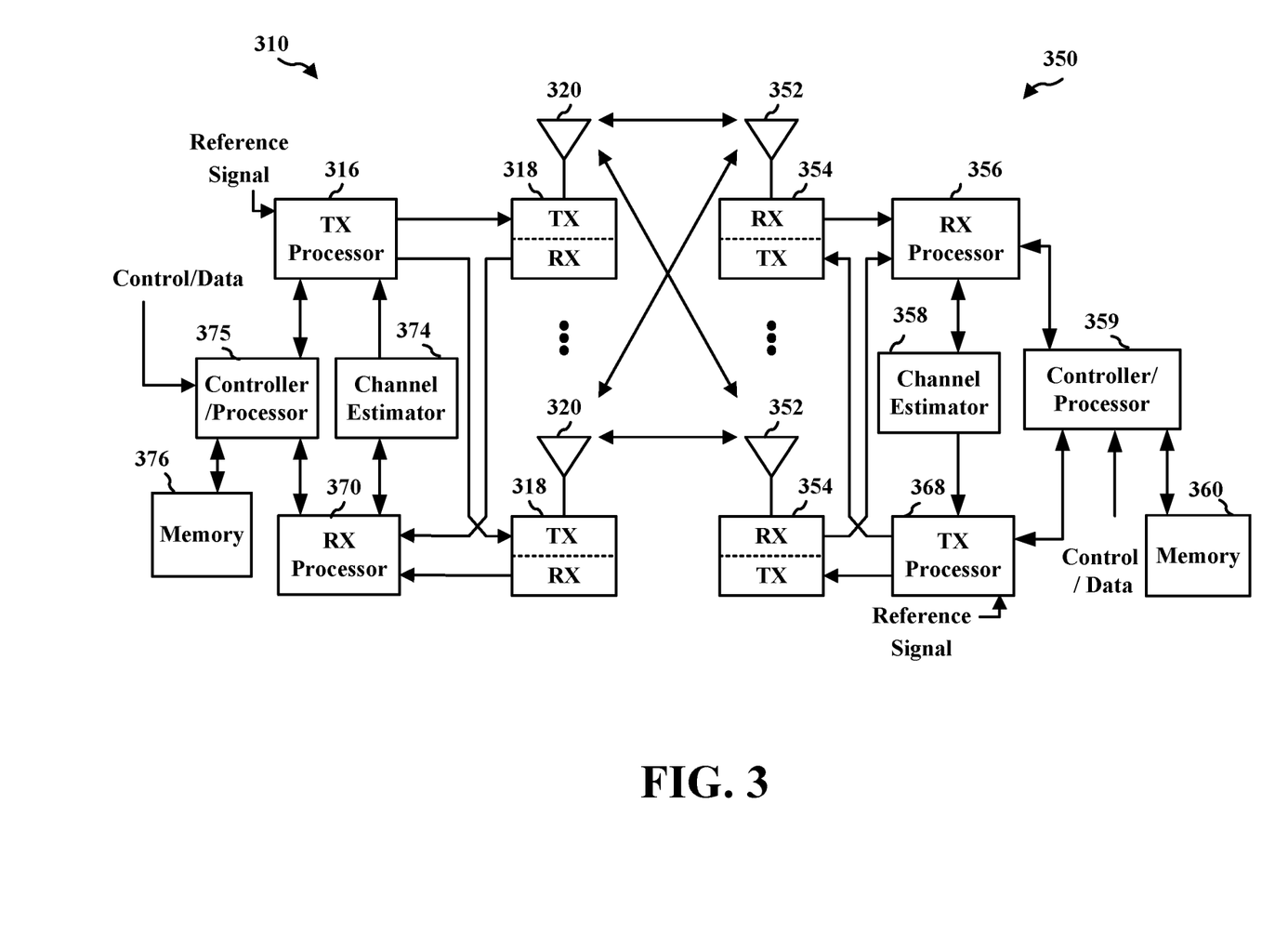
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

In some aspects of wireless communications, the transmission of uplink control information (UCI) can be piggybacked in certain data channels, e.g., PUSCH. As such, UCI can be transmitted in a PUSCH along with other uplink data. In some aspects, for rate matching UCI on a PUSCH, a code rate scaling factor, e.g., $\beta_{offset} > 1$, can be used to obtain a lower code rate than an indicated modulation and coding scheme (MCS). For instance, the number of resource elements (REs) per layer for UCI can be represented by:

$$N_{RE,UCI} = \frac{K_{UCI} \cdot \beta_{offset}}{K_{UL-SCH}} N_{RE},$$

where $N_{RE}$ is the total number of REs per layer of the PUSCH, $K_{UL-SCH}$ is the payload size of UL-SCH including transport block (TB) or code block (CB) cyclic redundancy check (CRC) bits. Also, $K_{UCI}$ is the UCI payload size including CRC bits (if any). To prevent the UCI occupying too many resources of the PUSCH, a portion factor, e.g., $\alpha \in \{0.5, 0.65, 0.8, 1.0\}$, can limit the maximum portion of resources that the UCI can occupy. Also, the number of REs per layer for UCI can be represented by:

$$N_{RE,UCI} = \min\left(\frac{K_{UCI} \cdot \beta_{offset}}{K_{UL-SCH}} N_{RE}, \alpha \cdot N_{RE}\right).$$

Some aspects of wireless communications can also utilize channel coding for a PDCCH. Additionally, polar codes can be adopted for the control channel in certain wireless communications, e.g., NR. In some aspects, the maximum coded block size can be 512 bits for downlink and 1024 bits for uplink. Also, the minimum coding rate can be 1/8, the maximum payload size without CRC can be 140 bits, and a 24-bit CRC may be appended to the payload. Rate-matching schemes can also include shortening, puncturing, and repetition. Moreover, the decoding complexity can be O(N× log$_2$(N)), where N is number of coded bits. In other words, complexity may not be a direct function of the coding rate. It is noted that there may be coding gain loss with more information bits.

Aspects of wireless communications can also make a coded block size determination. In some instances, the number of information bits can be K, the number of coded bits can be $N=2^n$, and the coded block size (e.g., after rate matching) can be E. If $$E \leq \left(\frac{9}{8}\right) \cdot 2^{(\lceil \log_2 E \rceil - 1)} \text{ and } \frac{K}{E} < \frac{9}{16},$$

then $n_1 = \lceil \log_2 E \rceil - 1$. If not, $n_1 = \lceil \log_2 E \rceil$. Also, $$R_{min} = \frac{1}{8} \text{ and } n_2 = \left\lceil \log_2\left(\frac{K}{R_{min}}\right)\right\rceil.$$

Further, $n = \max\{\min\{n_1, n_2, n_{max}\}, n_{min}\}$, where $n_{min} = 5$.

Some aspects of wireless communication can use DCI piggyback in the PDSCH, which can be similar to using UCI piggyback in the PUSCH. The piggyback DCI may be an aggregation of multiple downlink or uplink grants, so the delivery of these grants in PDSCH may be more efficient than sending them in the PDCCH region with blind decodings. In some aspects, the maximum number of information bits in DCI ($K_{DCI}$) for the PDCCH may be 140 bits. In this case, if the number of information bits in DCI ($K_{DCI}$) is larger than 140, then it may not be transmitted in the PDCCH. As such, there may be more bits that are needed to transmit the entire DCI. Accordingly, the number of information bits, or the payload size, of the DCI may need to be increased.

In some aspects, the aggregated piggyback DCI length can be larger than the maximum 164 bits supported in some PDCCHs. Even if the 164 limit can be increased, the piggyback DCI can be larger and may need a generic code block segmentation algorithm. Some aspects of wireless communications can utilize a beta offset parameter, $\beta_{offset}$, to indicate the amount of REs for DCI, and to indicate the payload size of the DCI. If these values can be calculated for a PDSCH, then the amount of REs for DCI can be calculated.

Some aspects of wireless communications can use the payload size of DCI ($K_{DCI}$) and $\beta_{offset}$ to control the coding rate of piggyback DCI, where the number of the REs for piggyback DCI can be calculated as:

$$N_{RE,DCI} = \frac{K_{DCI} \cdot \beta_{offset}}{K_{DL-SCH}} N_{RE}.$$

The total coded bits, M, can be equal to: $M = N_{RE,DCI} * Q$ m, where $Q$ m is the number of bits over a single modulation symbol. For QPSK, $Q$ m can be 2 bits per symbol. For 64 QAM, $Q$ m can be 6 bits per symbol. In some aspects, one modulation symbol can be mapped to one RE. So if $Q$ m=2, then $N_{RE,DCI} = M/2$. So then M/2 REs may be needed to carry the total coded bits. Also, if M=512, then the coded bits may need to be segmented or divided into multiple code blocks (CBs). So CBs can be a way to organize the coded bits. If the payload size of the DCI is known, as well as the beta offset parameter, then the number of REs ($N_{RE,DCI}$) can be calculated. By doing so, the total number of coded bits (M) can also be calculated.

As indicated above, there is a present need to transmit a larger amount of DCI over a PDSCH. If the DCI payload size including CRC bits, $K_{DCI}$, is larger than 140, then more than one CB may be utilized. If $K_{DCI}$ is less than 140, then one CB may be utilized. Accordingly, if $K_{DCI}$ is larger than 140, then it may need to be divided into more than one CB. So there is a present need to segment or divide the total number of coded bits (M) and number of information bits in DCI ($K_{DCI}$) into one or more code blocks (CBs).

Aspects of the present disclosure can transmit a larger amount of DCI over a PDSCH. For instance, aspects of the present disclosure can segment or divide the total number of coded bits (M) and the number of information bits in DCI ($K_{DCI}$) into one or more code blocks (CBs). Also, if $K_{DCI}$ is larger than 140, the present disclosure may segment or divide it into more than one CB.

Aspects of the present disclosure can also utilize coded bit based CB segmentation. For example, the present disclosure can compute the available number of coded bits and determine the number of CBs for CB segmentation under the principle that the coded bits per CB is around 512. This can result in an improved coding gain. Also, a transport block (TB) can include multiple CBs.

Aspects of the present disclosure also determine the number of code blocks (CBs) using the number of coded bits (M). So by determining the amount of CBs, the present disclosure can perform a coded bit segmentation. In some aspects, the present disclosure can align the payload size of each CB using filler bits (used in UCI CB segmentation), so the number of information bits in each CB can be similar. The present disclosure can also align the coded bit sizes of each CB using repetition (also used in UCI CB segmentation).

In order to perform the aforementioned calculations and determinations, aspects of the present disclosure can utilize one or more algorithms or equations. In some aspects, the present disclosure can utilize a single CB when $M \leq 512*\alpha$, where $\alpha=9/8$. By doing so, the encoding can utilize an existing design for PDCCH. The present disclosure can also utilize multiple CBs with segmentation when $M>512*\alpha$. This may result in all CBs having an identical encoder with the same number of information bits and coded bits.

In some aspects, the number of CBs, A, can be: $A=\lceil M/(512*\alpha) \rceil$. Also, the number of information bits per CB without CRC can be: $K=\lceil K_{DCI}/A \rceil$. The number of coded bits per CB can be: $E=\lfloor M/A \rfloor$. Also, the present disclosure can use an existing design for PDCCH if $E \leq 512*\alpha$. As indicated herein, a number of filler bits can be utilized for DCI payload. In some instances, prepending $K*A-K_{DCI}$ zeros to the DCI payload of the first CB can help to ensure the number of information bits per CB is similar. Additionally, if the DCI payload is a multiple of A, then filler bits may not be needed. Aspects of the present disclosure can also utilize a number of repetition coded bits for a last coded block. The present disclosure can also repeat the coded bits, e.g., M–E*A coded bits, for the last coded block to ensure the number of code bits per CB is similar. Also, if M is a multiple of E, there may not be any need for repetition bits to be added.

Figure 4:
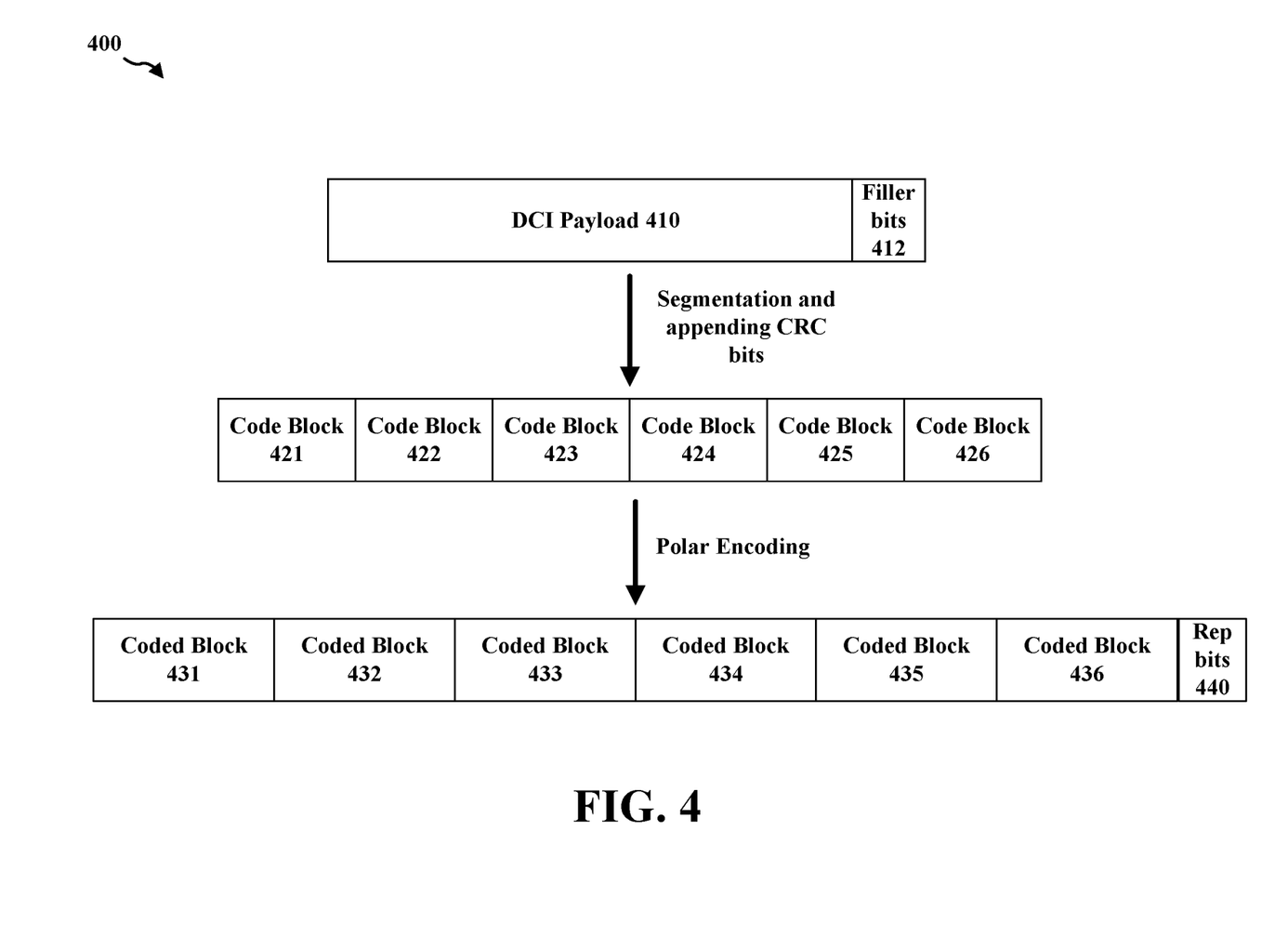
FIG. 4 is an example diagram of DCI segmentation in accordance with one or more techniques of the present disclosure.

FIG. 4 is an example diagram 400 of DCI segmentation in accordance with one or more techniques of the present disclosure. Diagram 400 includes DCI payload 410, filler bits 412, code block 421, code block 422, code block 423, code block 424, code block 425, code block 426, coded block 431, coded block 432, coded block 433, coded block 434, coded block 435, coded block 436, and repetition bits 440. As shown in FIG. 4, DCI payload 410 and filler bits 412 can undergo segmentation and appending CRC bits in order to convert to code blocks 421-426. Also, code blocks 421-426 can undergo polar encoding in order to convert to coded blocks 431-436.

Some aspects of FIG. 4 can include the following values: DCI payload ($K_{DCI}$)=808 and coding rate (R)=1/4. As such, the number of coded bits (M)=$K_{DCI}$/R=808/(1/4)=3232. The number of coded bits can also be calculated by: M=$N_{RE, DCI}$*Qm. Also, the number of CBs (A)=$\lceil M/(512*\alpha) \rceil$=3232/(512*9/8)=5.61, which is approximately 6 code blocks. The amount of filler bits added can also result in $K_{DCI}$ being a multiple of A. This can ensure that the number of information bits added to each CB includes the same value. In this case, there can be 2 filler bits appended to the DCI payload of 808 bits=808+2=810 bits, which is a multiple of 6.

Additionally, the number of information bits per CB without CRC (K) is equal to: K=$K_{DCI}$/A=808/6=134.67, which is approximately 135. The number of information bits per CB with 16-bit CRC=K+16=135+16=151. Also, the coded block size or number of coded bits per CB (E) is equal to: E=M/A=3232/6=538. If M is not a multiple of E, repetition bits may be added. Here, as 3232 is not a multiple of 538, there may be 4 repetition bits added to the last block to equal a multiple of 538.

As described above, the DCI payload of 808 (plus 2 filler bits) can be segmented or divided into 6 CBs. This can result in 135 information bits per CB (without CRC). As such, there are 151 information bits per CB (with 16-bit CRC). Also, polar encoding can result in a coded block size of 538 (with 4 repetition bits).

Some aspects of the present disclosure can include an improved coding gain perspective. For instance, a maximum CB size, $K_{max}$, may have UE implementation impact. The maximum number of CBs, $C_{max}$, may be a UE capability. Aspects of the present disclosure can also introduce a minimum CB size, $K_{min}$. So these aspects of the present disclosure can include similar steps mentioned above, but with maximum and minimum CB sizes and/or a maximum number of CBs.

Aspects of the present disclosure can also include a number of steps for maximum and minimum CB sizes and/or a maximum number of CBs. For example, the present disclosure can determine the number of code blocks using the number of coded bits computed, C. If $C>C_{max}$ (the maximum number of CBs a UE can handle), the present disclosure can set $C=C_{max}$. In some instances, if $$\frac{K_{DCI}}{C} > K_{max}$$

(the maximum CB size), there may be an error. Also, if $$\frac{K_{DCI}}{C} > K_{min}$$

and C>1, then C=C−1.

Aspects of the present disclosure can also utilize a number of CRC bits for a transport block (TB). For PDSCH or PUSCH CB segmentation, there may be a 24-bit CRC for a TB. If there is CB segmentation, the 24-bit CRC can be added for each CB. For UCI segmentation (up to 2 CBs), there can be an 11-bit CRC for each CB. In some aspects, the entire DCI payload can correspond to a TB. As the DCI payload may include an amount of CRC bits, each TB can include an amount of CRC bits. So the amount of information bits in each TB can be segmented into one or more CBs.

As indicated above, aspects of the present disclosure can include piggyback DCI CB segmentation. In some aspects, the piggyback DCI decoding may not be subject to blind decoding, e.g., as a long CRC may not be necessary. In some instances, the present disclosure can reuse a UCI CRC insertion mechanism, and add an 11-bit CRC for a TB. The present disclosure can also utilize a 16-bit CRC for a TB. This can be identical to the amount of CRC bits in the PDSCH. Also, the present disclosure can utilize a 19-bit CRC for a TB. Accordingly, the present disclosure can utilize three more bits for a successive cancellation list (SCL) decoder with L=8, e.g., for the case of a single block without CB CRC. So if a TB is less than the maximum payload of CB, there may be no segmentation. By doing so, the decoder can decode the TB directly. As such, the amount of CRC bits for each TB can be 0, 11, 16, or 19.

Aspects of the present disclosure can also utilize a number of CRC bits for each CB. In some aspects, the present disclosure can reuse a UCI CRC insertion mechanism and add an 11-bit CRC for each CB. This may not have an impact based on polar code CB segmentation e.g., applied to UCI with two CBs. The present disclosure can also apply a 16-bit CRC. For instance, there may be more CBs for DCI piggyback, so an improved CRC protection may be needed. Aspects of the present disclosure can also utilize a 19-bit CRC. Accordingly, the present disclosure can utilize three more bits for an SCL decoder with L=8 for each CB. Aspects of the present disclosure can also select between an 11-bit CRC and a 19-bit CRC depending on the amount of CBs. As such, the amount of CRC bits for each CB can be 0, 11, 16, or 19. Accordingly, the amount of CRC bits for each CB may depend on the number of CBs.

Figure 5:
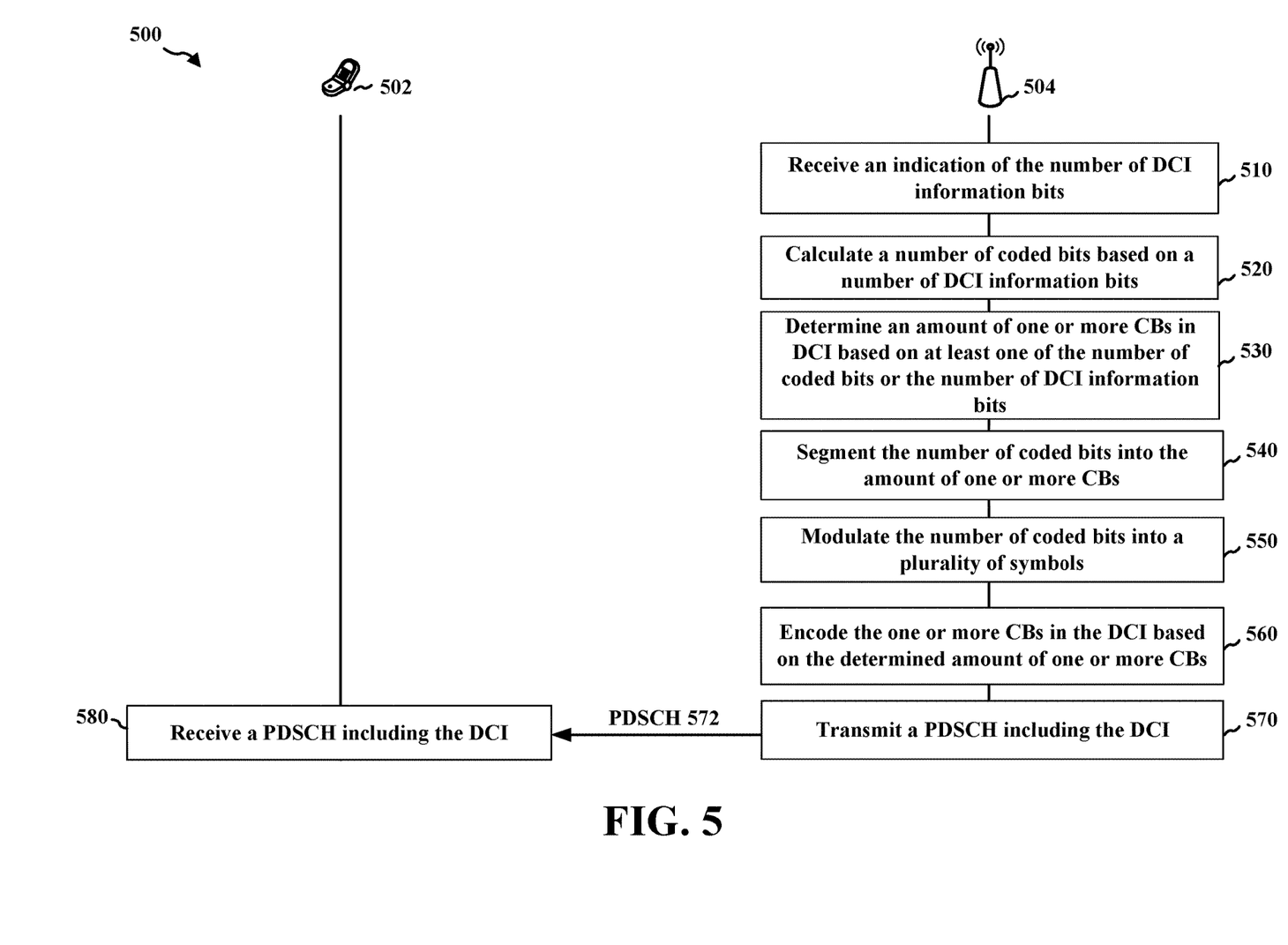
FIG. 5 is a diagram illustrating example communication between a UE and a base station in accordance with one or more techniques of the present disclosure.

FIG. 5 is a diagram 500 illustrating example communication between a UE 502 and a base station 504. At 510, the base station 504 may receive an indication of a number of downlink control information (DCI) information bits. At 520, the base station 504 may calculate a number of coded bits based on a number of DCI information bits. In some aspects, the number of coded bits may be further calculated based on at least one of a beta offset parameter or a number of resource elements (REs) for DCI. In addition, the number of DCI information bits may include a number of cyclic redundancy check (CRC) bits, where the number of CRC bits may be equal to 0, 11, 16, or 19.

At 530, the base station 504 may determine an amount of one or more code blocks (CBs) in DCI based on at least one of the number of coded bits or the number of DCI information bits, where each of the one or more CBs may include a plurality of the coded bits. Also, the amount of one or more CBs may be equal to the number of coded bits divided by the product of an alpha parameter and 512. In some aspects, the number of DCI information bits may include a number of filler bits when the number of DCI information bits is not a multiple of the amount of one or more CBs.

At 540, the base station 504 may segment the number of coded bits into the amount of one or more CBs. In some aspects, an amount of coded bits per CB may be equal to the number of coded bits divided by the amount of one or more CBs. Additionally, an amount of coded bits per coded block may include a number of repetition bits when the number of coded bits is not a multiple of the amount of coded bits per CB.

At 550, the base station 504 may modulate the number of coded bits into a plurality of symbols. In some aspects, the plurality of symbols may be mapped to a plurality of resource elements (REs). At 560, the base station 504 may encode the one or more CBs in the DCI based on the determined amount of one or more CBs, where the encoded one or more CBs may correspond to the one or more coded blocks.

At 570, the base station 504 may transmit a physical downlink shared channel (PDSCH) including the DCI, e.g., PDSCH 572. At 580, the UE 502 may receive the PDSCH including DCI, e.g., PDSCH 572. In some instances, the DCI may include at least one of the one or more CBs or one or more coded blocks.

In some aspects, the DCI may be segmented into at least one of the one or more CBs or the one or more coded blocks. Further, each of the one or more CBs may include a number of cyclic redundancy check (CRC) bits, where the number of CRC bits may be equal to 0, 11, 16, or 19. Also, the number of coded bits may be equal to the number of DCI information bits divided by a coding rate. Further, the number of DCI information bits may correspond to a transport block (TB).

Figure 6:
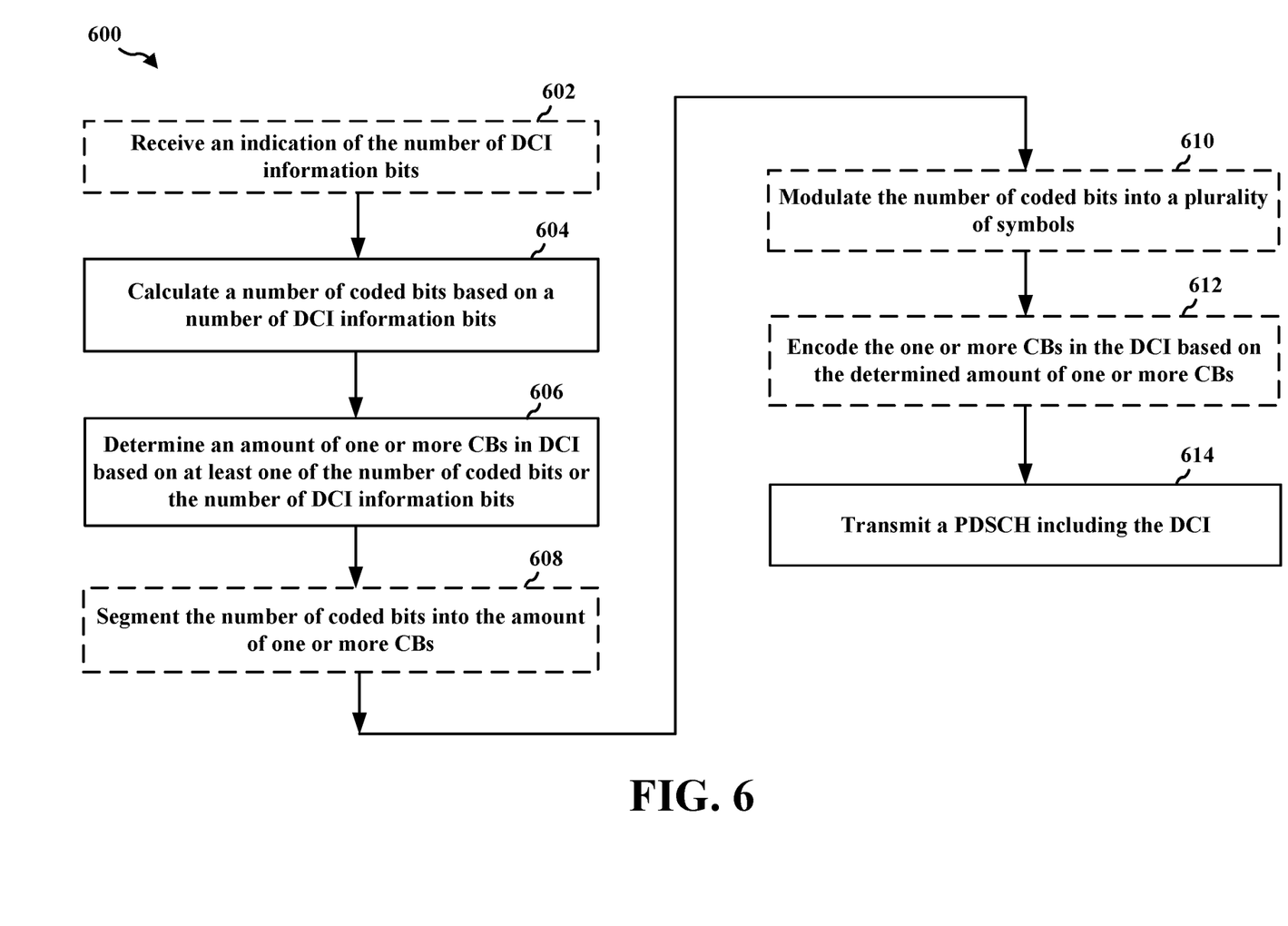
FIG. 6 is a flowchart of a method of wireless communication.

FIG. 6 is a flowchart 600 of a method of wireless communication. The method may be performed by a base station or a component of a base station (e.g., the base station 102, 180, 310, 504; an apparatus; a processing system, which may include the memory 376 and which may be the entire base station or a component of the base station, such as the TX processor 316, the RX processor 370, and/or the controller/processor 375). Optional aspects are illustrated with a dashed line. The methods described herein can provide a number of benefits, such as improving communication signaling, resource utilisation, and/or power savings.

At 602, the apparatus may receive an indication of a number of downlink control information (DCI) information bits, as described in connection with the examples in FIGS. 4 and 5.

At 604, the apparatus may calculate a number of coded bits based on a number of downlink control information (DCI) information bits, as described in connection with the examples in FIGS. 4 and 5. In some aspects, the number of coded bits may be further calculated based on at least one of a beta offset parameter or a number of resource elements (REs) for DCI, as described in connection with the examples in FIGS. 4 and 5. In addition, the number of DCI information bits may include a number of cyclic redundancy check (CRC) bits, where the number of CRC bits may be equal to 0, 11, 16, or 19, as described in connection with the examples in FIGS. 4 and 5.

At 606, the apparatus may determine an amount of one or more code blocks (CBs) in DCI based on at least one of the number of coded bits or the number of DCI information bits, where each of the one or more CBs may include a plurality of the coded bits, as described in connection with the examples in FIGS. 4 and 5. Also, the amount of one or more CBs may be equal to the number of coded bits divided by the product of an alpha parameter and 512, as described in connection with the examples in FIGS. 4 and 5. In some aspects, the number of DCI information bits may include a number of filler bits when the number of DCI information bits is not a multiple of the amount of one or more CBs, as described in connection with the examples in FIGS. 4 and 5.

At 608, the apparatus may segment the number of coded bits into the amount of one or more CBs, as described in connection with the examples in FIGS. 4 and 5. In some aspects, an amount of coded bits per CB may be equal to the number of coded bits divided by the amount of one or more CBs, as described in connection with the examples in FIGS. 4 and 5. Additionally, an amount of coded bits per coded block may include a number of repetition bits when the number of coded bits is not a multiple of the amount of coded bits per CB, as described in connection with the examples in FIGS. 4 and 5.

At 610, the apparatus may modulate the number of coded bits into a plurality of symbols, as described in connection with the examples in FIGS. 4 and 5. In some aspects, the plurality of symbols may be mapped to a plurality of resource elements (REs), as described in connection with the examples in FIGS. 4 and 5.

At 612, the apparatus may encode the one or more CBs in the DCI based on the determined amount of one or more CBs, as described in connection with the examples in FIGS.

4 and 5. In some aspects, the encoded one or more CBs may correspond to the one or more coded blocks, as described in connection with the examples in FIGS. 4 and 5.

At 614, the apparatus may transmit a physical downlink shared channel (PDSCH) including the DCI, as described in connection with the examples in FIGS. 4 and 5. In some instances, the DCI may include at least one of the one or more CBs or one or more coded blocks, as described in connection with the examples in FIGS. 4 and 5.

In some aspects, the DCI may be segmented into at least one of the one or more CBs or the one or more coded blocks, as described in connection with the examples in FIGS. 4 and 5. Further, each of the one or more CBs may include a number of cyclic redundancy check (CRC) bits, where the number of CRC bits may be equal to 0, 11, 16, or 19, as described in connection with the examples in FIGS. 4 and 5. Also, the number of coded bits may be equal to the number of DCI information bits divided by a coding rate, as described in connection with the examples in FIGS. 4 and 5. Further, the number of DCI information bits may correspond to a transport block (TB), as described in connection with the examples in FIGS. 4 and 5.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
   calculating a number of coded bits based on a number of downlink control information (DCI) information bits;
   determining an amount of one or more code blocks (CBs) in DCI based on at least one of the number of coded bits or the number of DCI information bits, each of the one or more CBs including a plurality of the coded bits, wherein the amount of the one or more CBs is based on the number of coded bits divided by a product of an alpha parameter and a threshold number; and
   transmitting a physical downlink shared channel (PDSCH) including the DCI, wherein the DCI includes at least one of the one or more CBs or one or more coded blocks.

2. The method of claim 1, further comprising:
   receiving an indication of the number of DCI information bits.

3. The method of claim 1, further comprising:
   encoding the one or more CBs in the DCI based on the determined amount of one or more CBs, wherein the encoded one or more CBs correspond to the one or more coded blocks; and
   modulating the number of coded bits into a plurality of symbols, wherein the plurality of symbols are mapped to a plurality of resource elements (REs).

4. The method of claim 1, further comprising:
   segmenting the number of coded bits into the amount of one or more CBs.

5. The method of claim 4, wherein a first amount of coded bits per CB is equal to the number of coded bits divided by the amount of the one or more CBs.

6. The method of claim 4, wherein a first amount of coded bits per CB block includes a number of repetition bits when the number of coded bits is not a multiple of the amount of the coded bits per CB.

7. The method of claim 1, wherein the DCI is segmented into at least one of the one or more CBs or the one or more coded blocks.

8. The method of claim 1, wherein the threshold number is 512, and the amount of the one or more CBs is equal to the number of coded bits divided by the product of the alpha parameter and 512.

9. The method of claim 1, wherein each of the one or more CBs includes a number of cyclic redundancy check (CRC) bits, wherein the number of CRC bits is equal to 0, 11, 16, or 19.

10. The method of claim 1, wherein the number of DCI information bits includes a number of filler bits when the number of DCI information bits is not a multiple of the amount of one or more CBs.

11. The method of claim 1, wherein the number of coded bits is equal to the number of DCI information bits divided by a coding rate.

12. The method of claim 1, wherein the number of DCI information bits corresponds to a transport block (TB).

13. The method of claim 1, wherein the number of DCI information bits includes a number of cyclic redundancy check (CRC) bits, wherein the number of CRC bits is equal to 0, 11, 16, or 19.

14. The method of claim 1, wherein the number of coded bits is further calculated based on at least one of a beta offset parameter or a number of resource elements (REs) for the DCI.

15. An apparatus for wireless communication of a base station, comprising:
- memory; and
- at least one processor coupled to the memory and configured to:
  - calculate a number of coded bits based on a number of downlink control information (DCI) information bits;
  - determine an amount of one or more code blocks (CBs) in DCI based on at least one of the number of coded bits or the number of DCI information bits, each of the one or more CBs including a plurality of the coded bits, wherein the amount of the one or more CBs is based on the number of coded bits divided by a product of an alpha parameter and a threshold number; and
  - transmit a physical downlink shared channel (PDSCH) including the DCI, wherein the DCI includes at least one of the one or more CBs or one or more coded blocks.

16. The apparatus of claim 15, wherein the at least one processor is further configured to:
- receive an indication of the number of DCI information bits.

17. The apparatus of claim 15, wherein the at least one processor is further configured to:
- encode the one or more CBs in the DCI based on the determined amount of one or more CBs, wherein the encoded one or more CBs correspond to the one or more coded blocks.

18. The apparatus of claim 17, wherein the at least one processor is further configured to:
- modulate the number of coded bits into a plurality of symbols.

19. The apparatus of claim 18, wherein the plurality of symbols are mapped to a plurality of resource elements (REs).

20. The apparatus of claim 15, wherein the at least one processor is further configured to:
- segment the number of coded bits into the amount of one or more CBs.

21. The apparatus of claim 20, wherein a first amount of coded bits per CB is equal to the number of coded bits divided by the amount of the one or more CBs.

22. The apparatus of claim 20, wherein a first amount of coded bits per CB includes a number of repetition bits when the number of coded bits is not a multiple of the amount of the coded bits per CB.

23. The apparatus of claim 15, wherein the DCI is segmented into at least one of the one or more CBs or the one or more coded blocks.

24. The apparatus of claim 15, wherein the threshold number is 512, and the amount of the one or more CBs is equal to the number of coded bits divided by the product of the alpha parameter and 512.

25. The apparatus of claim 15, wherein each of the one or more CBs includes a number of cyclic redundancy check (CRC) bits, wherein the number of CRC bits is equal to 0, 11, 16, or 19.

26. The apparatus of claim 15, wherein the number of DCI information bits includes a number of filler bits when the number of DCI information bits is not a multiple of the amount of one or more CBs.

27. The apparatus of claim 15, wherein the number of coded bits is equal to the number of DCI information bits divided by a coding rate.

28. An apparatus for wireless communication of a base station, comprising:
- means for calculating a number of coded bits based on a number of downlink control information (DCI) information bits;
- means for determining an amount of one or more code blocks (CBs) in DCI based on at least one of the number of coded bits or the number of DCI information bits, each of the one or more CBs including a plurality of the coded bits, wherein the amount of the one or more CBs is based on the number of coded bits divided by a product of an alpha parameter and a threshold number; and
- means for transmitting a physical downlink shared channel (PDSCH) including the DCI, wherein the DCI includes at least one of the one or more CBs or one or more coded blocks.

29. A non-transitory computer-readable medium storing computer executable code for wireless communication of a base station, the code when executed by a processor causes the processor to:
- calculate a number of coded bits based on a number of downlink control information (DCI) information bits;
- determine an amount of one or more code blocks (CBs) in DCI based on at least one of the number of coded bits or the number of DCI information bits, each of the one or more CBs including a plurality of the coded bits, wherein the amount of the one or more CBs is based on the number of coded bits divided by a product of an alpha parameter and a threshold number; and
- transmit a physical downlink shared channel (PDSCH) including the DCI, wherein the DCI includes at least one of the one or more CBs or one or more coded blocks.

30. The apparatus of claim 15, further comprising a transceiver coupled to the at least one processor.

* * * * *